(12) United States Patent
Heppner et al.

(10) Patent No.: US 7,877,978 B2
(45) Date of Patent: Feb. 1, 2011

(54) POWER TRANSMISSION CHAIN MADE FROM METAL

(75) Inventors: Christine Heppner, Siegen (DE); Gerd Schöbel, Bergisch Gladbach (DE)

(73) Assignee: Kabelschlepp GmbH, Wenden-Gerlingen (DE)

( * ) Notice: Subject to any disclaimer, the term of this patent is extended or adjusted under 35 U.S.C. 154(b) by 760 days.

(21) Appl. No.: 11/726,158

(22) Filed: Mar. 21, 2007

(65) Prior Publication Data

US 2007/0234701 A1   Oct. 11, 2007

(30) Foreign Application Priority Data

Apr. 11, 2006   (DE) .................. 10 2006 017 316

(51) Int. Cl.
  *F16G 13/16*   (2006.01)
(52) U.S. Cl. .............. 59/78.1; 248/49; 248/51; 29/434
(58) Field of Classification Search .......... 59/78.1; 248/59, 60, 61, 49, 51; 29/434
  See application file for complete search history.

(56) References Cited

U.S. PATENT DOCUMENTS

| | | | | |
|---|---|---|---|---|
| 3,053,358 A | | 9/1962 | Gross | |
| 3,590,854 A | | 7/1971 | Cork | |
| 3,848,407 A | * | 11/1974 | Moritz | 248/51 |
| 3,921,388 A | * | 11/1975 | Loos et al. | 59/78.1 |
| 4,063,060 A | * | 12/1977 | Litch, III | 29/436 |
| 4,104,871 A | | 8/1978 | Moritz | |
| 4,499,720 A | | 2/1985 | Klein | |
| 4,590,961 A | * | 5/1986 | Schumann | 248/49 |
| 4,625,507 A | * | 12/1986 | Moritz et al. | 59/78.1 |
| 4,858,424 A | * | 8/1989 | Loding et al. | 59/78.1 |
| 5,048,283 A | * | 9/1991 | Moritz et al. | 59/78.1 |
| 6,161,372 A | * | 12/2000 | Wehler | 59/78.1 |
| 6,349,534 B1 | * | 2/2002 | Zanolla et al. | 248/49 |

FOREIGN PATENT DOCUMENTS

| | | |
|---|---|---|
| DE | 312 912 | 6/1919 |
| DE | 2 415 374 | 10/1975 |
| DE | 129823 | 5/1976 |
| DE | 129 823 | 8/1978 |
| DE | 31 21 912 A1 | 12/1982 |
| DE | 31 39 735 A1 | 4/1983 |

(Continued)

OTHER PUBLICATIONS

Dubbel, Handbook of Mechanical Engineering, ISBN 3-540-12418-7, S. 960-961 (1986) 12pp.

(Continued)

*Primary Examiner*—David B Jones
(74) *Attorney, Agent, or Firm*—Smith Law Office

(57) ABSTRACT

In order to construct a power transmission chain, a configuration of a metal sideplate is proposed in the case of which the sideplate has a first end region and a second end region, the first end region having at least two through-holes. The second end region of the sideplate made from metal has a number of elements which corresponds to the number of through-holes, which elements at least partially extend during the construction of a power transmission chain into the respective through-hole of another sideplate, the elements protruding from the plane of the sideplate owing to a forming method, in particular plunging.

9 Claims, 4 Drawing Sheets

FOREIGN PATENT DOCUMENTS

| DE | 84 06 050.6 | 10/1986 |
|----|----|----|
| DE | 38 22 385 A1 | 1/1989 |
| DE | 195 41 928 C1 | 6/1997 |
| EP | 0 770 793 A1 | 5/1997 |

OTHER PUBLICATIONS

"Manufacturing Processes Forming Under Combination of Tensile and Compressive Conditions," DIN 8584-1, Sep. 2003, 18pp.

English language Translated Description and Claims of DE 2 415 374, European Patent Office's esp@cenet.com database, 3pp.

English language Abstract, Translated Description and Claims of DE 31 39 735 A1, European Patent Office's esp@cenet.com database, 5pp.

English language Translated Description and Claims of DE 38 22 385 A1, European Patent Office's esp@cenet.com database, 3pp.

English language Translated Description and Claims of DE 84 06 050.6, European Patent Office's esp@cenet.com database, 2pp.

English language Abstract, Translated Description and Claims of DE 195 41 928 C1, European Patent Office's esp@cenet.com database, 6pp.

English language Abstract of DE 696 07 101 T2 corresponding to EP 0 770 793 A1, European Patent Office's esp@cenet.com database, 1p.

English language Abstract of DE 31 21 912 A1, European Patent Office's esp@cenet.com database, 1pg.

* cited by examiner

POWER TRANSMISSION CHAIN MADE FROM METAL

FIELD AND BACKGROUND OF THE INVENTION

The subject matter of the invention is a sideplate made from metal of a chain link of a power transmission chain, a chain link of a power transmission chain and a power transmission chain.

So called power transmission chains are used to guide lines, hoses, tubes or the like between a stationary connection point and a moveable connection point. The lines are used to direct or feed power, consumables or the like to the point of consumption. A moveable consumer can, for example, be a carriage of a machine tool. It is known that power transmission chains can be produced from plastic. Such plastic power transmission chains are restricted as to field of use.

This restriction can be dictated by the lines, hoses or the like which are to be guided. In specific applications, the weight of the lines is so great that it exceeds the load carrying capacity of a plastic power transmission chain. Moreover, the use of power transmission chains made from plastic can be restricted from the environmental influences.

It is known to use power transmission chains made from metal. The power transmission chains consist of chain links interconnected in an articulated fashion. The chain links are formed by two chain sideplates spaced apart from one another which are interconnected by at least one crosspiece. The sideplates consist of a metal. A power transmission chain made from metal is disclosed, for example, in DD 129 823. At one end region, the sideplates have arcuate through-holes and a through-hole, and a through-hole for holding an articulated bolt. The other end region has bores through which corresponding bolts can be guided. The bolts are secured by means of appropriate securing means. The outlay on production of such a power transmission chain is not inconsiderable, since it is necessary to handle a plurality of components.

DE 31 21 912 A1 discloses a power transmission chain which has pivotably interconnected chain links. The chain links comprise chain sideplates in which there are provided coaxially with the articulation axes peripheral through-holes in the shape of a circular arc through which there engage elements which delimit the pivoting movement of the sideplates relative to one another by being stopped at the ends of the through-holes. These elements are permanently connected to an external restricting washer by spot welding. After being extended through the through-holes of the chain sideplates, the elements are connected to another external restricting washer.

SUMMARY OF THE INVENTION

It is the object of the present invention to specify on this basis a sideplate, made from metal, of a chain link of a power transmission chain which can be produced more easily.

The inventive sideplate, made from a metal, of a chain link of a power transmission chain is distinguished in that it has a first end region and a second end region. The first end region has at least two through-holes. The second end region has a number of elements which corresponds to the number of the through-holes. In the construction of a power transmission chain, the elements project at least partially into the respective through-hole of a sideplate of a neighbouring chain link. The elements are constructed by a forming method in a fashion protruding from the plane of the sideplate.

This inventive construction of a sideplate reduces the outlay on producing the latter, since the elements can form both a stop and a bolt without the need to use additional bolts in the way known from the prior art.

A refinement of a sideplate is preferred in which the elements are constructed by means of a combination of tensile and compressive conditions. It is particularly preferred in this case to construct the elements by plunging. The plunging of the elements can be performed with or without prepunching. An improved quality of the elements is achieved by prepunching. If the plunging is performed without prepunching, this should be performed when the inside diameter of the element is less than or equal to 10 mm.

If the plunging is performed with prepunching, it is advantageous when a counter holder comes into use during the plunging operation, since additional compressive stress is thereby introduced into the forming zone and higher expansion ratios are enabled.

A refinement is preferred in which at least one throughhole is constructed in the shape of a circular arc. The length of the circular arc determines the pivoting angle of neighbouring sideplates when chain links are built up from the inventive sideplates and the latter are interconnected.

According to yet a further advantageous refinement of the invention, it is proposed that one through-hole is substantially circular, the at least one through-hole in the shape of a circular arc being substantially arranged coaxially with the circular through-hole. In common with an element which projects into the circular through-hole, this circular through-hole forms an articulated joint of two neighbouring sideplates.

According to yet a further advantageous refinement of the sideplate, it is proposed that the sideplate is of cranked construction. Such a refinement of the sideplate creates the possibility of building up a power transmission chain from sideplates which are of identical design, it being possible for the sideplates to be respectively interconnected by an appropriate traversal for assembling purposes. In order for two neighbouring interconnected sideplates to be axially secured, it is proposed that next to the elements the sideplates have at least one projection which protrudes from the plane of the sideplate and has a section constructed in a fashion substantially parallel to the sideplate. In the assembled state, the neighbouring sideplate engages between the sideplate and the section such that neighbouring sideplates are axially secured. The free space between the section and the sideplate is dimensioned in this case so as to enable neighbouring sideplates to be connected, the elements being introduced into the throughholes.

The projections are preferably constructed by means of a forming method.

It is, moreover, an object of the present invention to specify a method for producing a sideplate, made from metal, of a chain link of a power transmission chain which can be carried out with a low outlay.

The inventive method for producing a sideplate, made from metal, of a power transmission chain comprises the following steps:

a) providing a blank of a sideplate,
b) constructing at least two through-holes at an end region, and
c) constructing a number, corresponding to the number of the through-holes, of elements by means of a forming method such that the elements protrude from the plane of the sideplate.

The through-holes can be constructed by means of a cutting or punching operation. It is possible to construct the through-holes by means of a laser cutting operation. The blanks can be cut out from a metal plate.

The elements are constructed by means of a combination of tensile and compressive conditions. In particular, this is performed by plunging with or without prepunching. The prepunching can be performed by cutting, in particular laser cutting, or punching. The diameter of the prepunched hole is a function of the expansion ratio, that is to say of the ratio of the inside diameter of the element to the prepunching diameter. The expansion or the plunging can be performed with the aid of a counter holder. Higher expansion ratios can be achieved when use is made of a counter holder. Whether or not prepunching is expedient depends on the ratio of the prepunching diameter to the thickness of the blank of the sideplate.

A method is preferred in which at least one through-hole is constructed in the shape of a circular arc, in particular is punched out. It is possible to provide a number of through-holes in the shape of a circular arc which lie on a common imaginary circular circumference. The length of the through-holes is preferably identical for all. The pivoting angle of neighbouring sideplates of a power transmission chain is determined by the length of the through-holes.

It is advantageous, but not mandatory when one through-hole is constructed substantially in the shape of a circle, in particular is punched out. This through-hole is preferably arranged at the centre of the through-holes in the shape of a circular arc such that this circular through-hole can form an articulated connection with a corresponding element.

In accordance with a yet further advantageous design of the method, it is proposed that there is constructed next to the elements at least one projection which projects from the plane of the sideplate and has a section running substantially parallel to the sideplate. If appropriate, the projection can be constructed by prepunching. The projection is preferably constructed by means of a forming method, in particular by punch drawing. In accordance with a yet further advantageous idea, it is proposed that the sideplate is constructed in a cranked fashion by means of a forming method. A construction is preferred here in which the blank is firstly constructed in a cranked fashion, before at least one through-hole and one element are constructed. A higher tolerance reliability is achieved by this measure.

The sideplates can be interconnected by at least one crosspiece. The connection can be a screw connection. To this end, the sideplates have appropriate openings through which screws can be guided. It is also possible for the crosspiece to be connected to the sideplates by a form-fitting connection.

Particularly preferred is a refinement of a power transmission chain which has a semicontinuous arrangement. This means that crosspieces are provided in the case of each second chain link. In order to ensure axial security against loosening of the articulated connection of the chain links which have no crosspieces, it is proposed that at least one securing element is provided which extends through the element and a through-hole.

Preference is given in this case to a refinement of the securing element in which the latter has a head and a shank, at least one aid being connected to the shank, such that the securing element is preferably detachably connected to the sideplates.

According to a yet further advantageous refinement of the power transmission chain, it is proposed that the element has an internal thread, and the securing element has an external thread. The internal thread can preferably be constructed during the plunging.

Preference is given to a refinement of the power transmission chain in which the sideplate and, in particular, the element are constructed such that the internal thread inside the element is produced during the assembly by a thread-cutting or self-tapping screw.

According to a yet further advantageous refinement of the power transmission chain according to the invention, it is proposed that the securing element is connected to the element in a self-closed and/or friction locked. This may be, for example, a bayonet type connection between the securing element and the element.

Particular preference is given to a refinement of the power transmission chain according to the invention in which the securing element is connected to the element such that the element is reinforced by the securing element, as a result of which it is possible to transmit higher bending moments and tensile forces between the sideplates of neighbouring chain links. The securing element need not in this case necessarily extend through the element. It is possible to transmit relatively high bending moments and tensile forces merely by having the securing element project into the element. Particular preference is given in this case to a refinement in which the length of the securing element is dimensioned such that the latter does not protrude from the sideplate. Given such a construction of the securing element, the latter has a safety function with regard to the transmission of the higher bending moments and tensile forces. If the element protrudes correspondingly, and if it is provided with an aid, the securing element thus additionally forms a safeguard against axial displacement of the sideplates.

Further details and advantages of the invention are explained with the aid of the exemplary embodiments illustrated in the drawing, without the subject matter of the invention being limited to this particular embodiment.

DETAILED DESCRIPTION OF THE PREFERRED EMBODIMENTS

Figure 1:
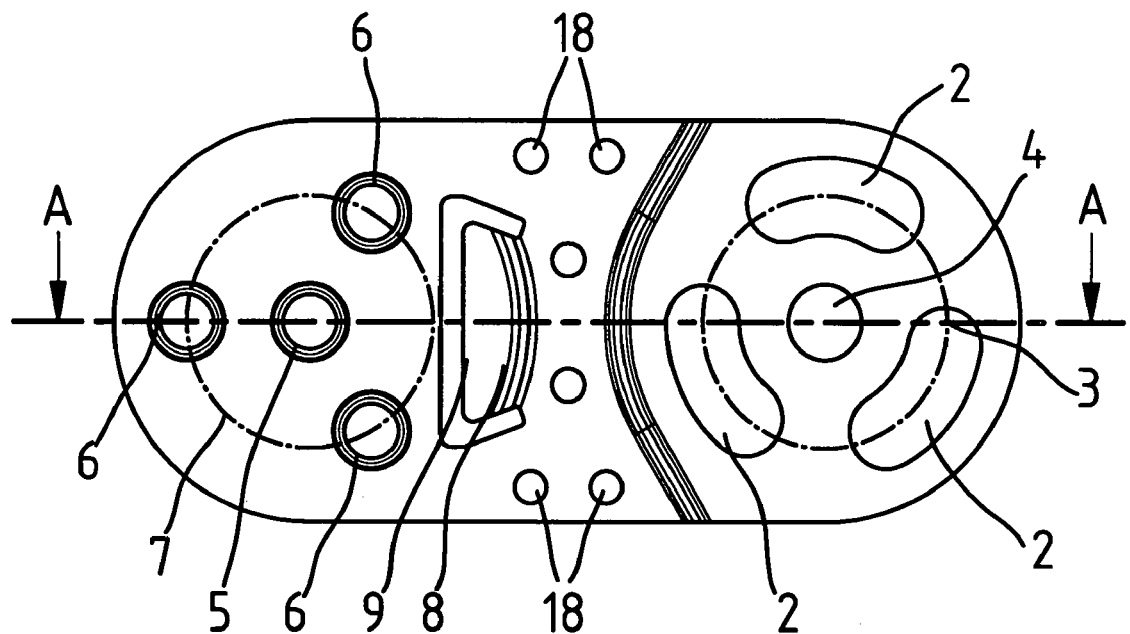
FIG. 1 shows a sideplate in a front view.

FIG. 1 illustrates a sideplate for a chain link of a power transmission chain, in a front view. The sideplate 1 is made from metal. It has a first end region and a second end region. The first end region has three through-holes 2 in the exemplary embodiment illustrated. The through-holes 2 are constructed in the shape of a circular arc. They lie on a common imaginary circular circumference 3. The through-holes 2 surround a through-hole 4 which is constructed substantially in the shape of a circle and is constructed substantially coaxially with the imaginary circle 3.

Constructed at the opposite end region is a number of elements 5, 6 which corresponds to the number of through-holes, which elements at least partially extend during the construction of a power transmission chain into the respective through-hole of another sideplate. Arranged centrally is an element 5 which is such that it forms together with the through-hole 4 an articulated connection between two neighbouring sideplates. The elements 6 are arranged on an imaginary circular circumference 7. If two sideplates are interconnected, the elements 6 engage in the through-holes 2 in the shape of a circular arc, as may be seen from FIG. 4.

The elements 5, 6 are produced by means of a forming method. They protrude from the plane of the sideplate 1, as may be seen from FIGS. 2 and 3. The elements 5, 6 are constructed by means of plunging, preferably with prepunching. They have a substantially circular cross section. The height of the elements 5, 6 preferably corresponds to the thickness of the sideplate 1.

Bores 7 are provided between the first and the second end region of the sideplate. The bores 7 serve for connecting to a crosspiece (not illustrated).

Figure 2:
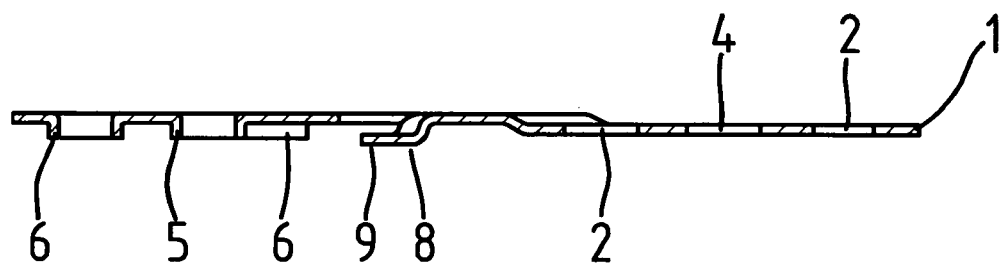
FIG. 2 shows the sideplate in the section along the line of section A-A.
Figure 3:
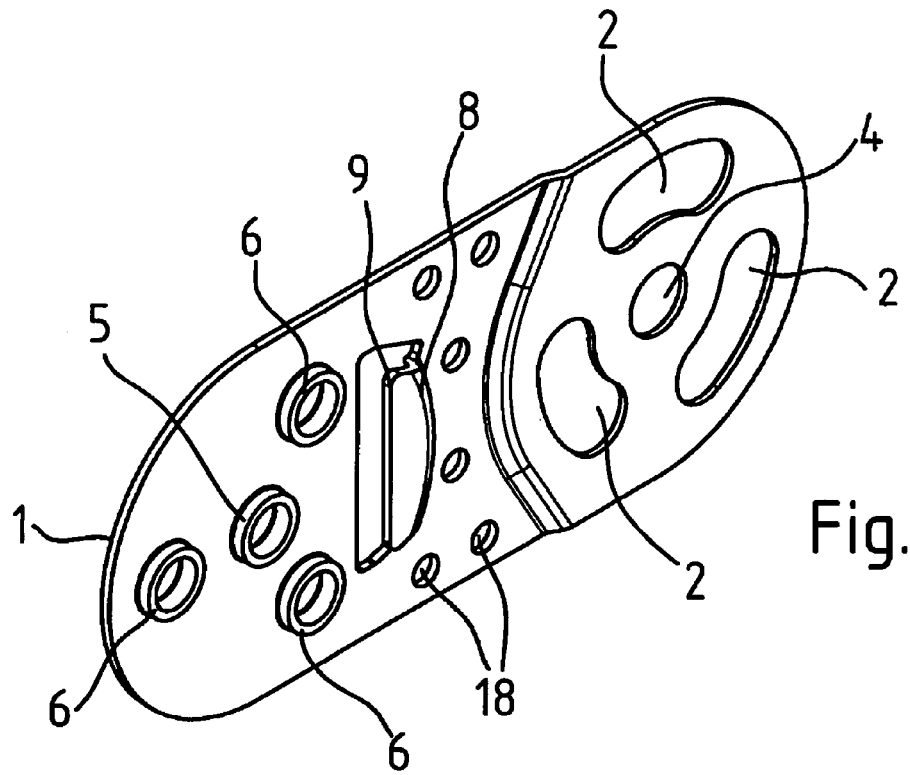
FIG. 3 shows the sideplate in a perspective view.

It may be seen from the illustration, in particular from FIGS. 2 and 3, that the sideplate 1 is of cranked construction. Owing to this construction, it is possible to build up a power transmission chain from the same chain sideplates. A projection 8 protruding from the plane of the sideplate 1 is provided next to the elements 5, 6. The projection 8 has a section 9 constructed in a fashion substantially parallel to the sideplate 1. The distance between the section 9 and the sideplate 1 is selected such that an end region of a sideplate can be inserted into the space between the sideplate and the section 9 where two sideplates are interconnected.

Figure 4:
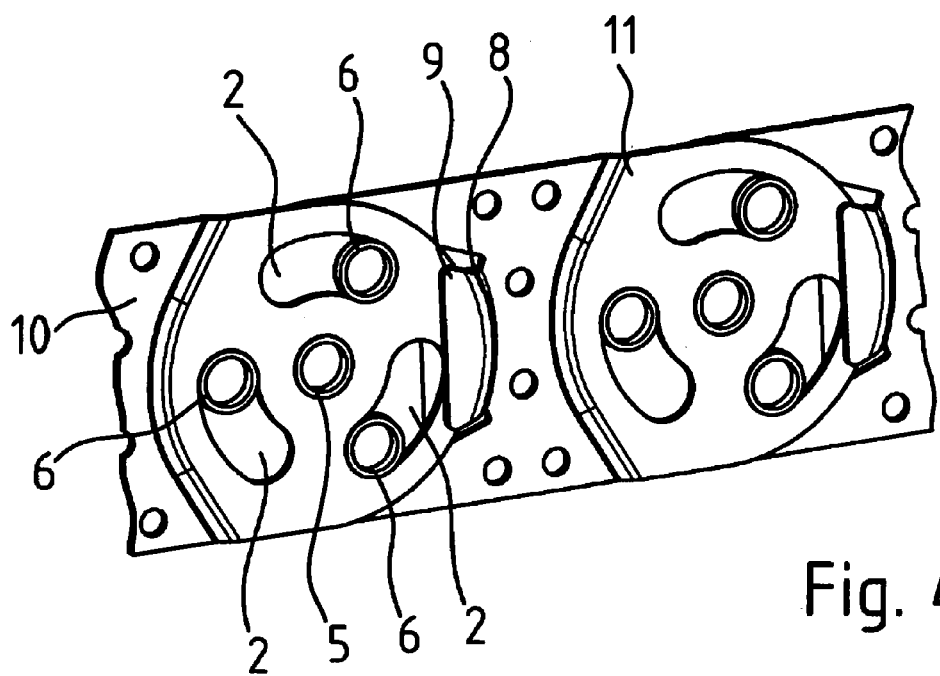
FIG. 4 shows two interconnected sideplates in enlarged fashion and in a front view.

The connection of two sideplates 10, 11 may be seen from FIG. 4. The elements 6 of the sideplate 11 engage in the arcuate through-holes 2 of the sideplate 10. The element 5 engages in the circular through-hole of the sideplate 10. An articulated connection is thereby constructed between the sideplates 10, 11. The pivoting angle is determined by the length of the through-holes 2 in the shape of a circular arc, and the outside diameter of the element 6.

The sideplate 11 has a projection 8 which has a section 9. An edge region of the sideplate 10 is arranged below the section 9 so as also to provide axial security between the sideplate 10 and the sideplate 11 by the combination of the projection 8 and the edge region of the sideplate 10.

Figure 5:
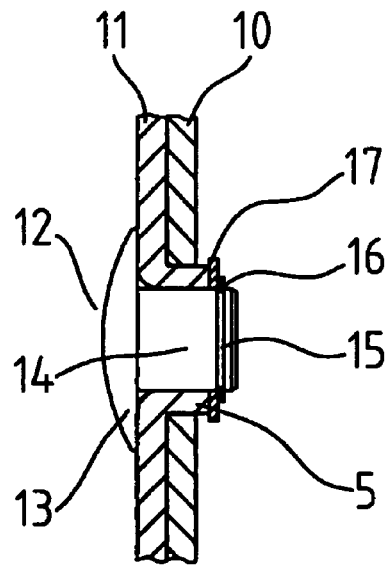
FIG. 5 shows an articulated connection of two sideplates, in section.

In order to increase the security in the case of a power transmission chain which is constructed from the inventive sideplates, it is proposed to use a securing element such as may be seen from FIG. 5. FIG. 5 shows a cross sectional view through the articulated connection between the interconnected sideplates of a power transmission chain.

The element 5 extends through the through-hole 4. A securing element 12 is introduced into the element 4. Said securing element has a head 13 which is brought to bear against the sideplate 11. Adjoining the head 13 is a shank 14 which is of substantially circular construction and extends through the element 5. Next to the free end of the shank 14 is an annular groove 15 into which an aid 16 is introduced. The aid 16 is preferably a securing ring. A washer 17 is arranged between the securing ring or aid 16 and the end face of the through-hole 5. This is not mandatory. It is also possible to secure without a washer 17.

The arrangement of the securing element 12 is preferably selected such that the head 13 is arranged on the inside of the sideplates or of the chain link.

Figure 6:
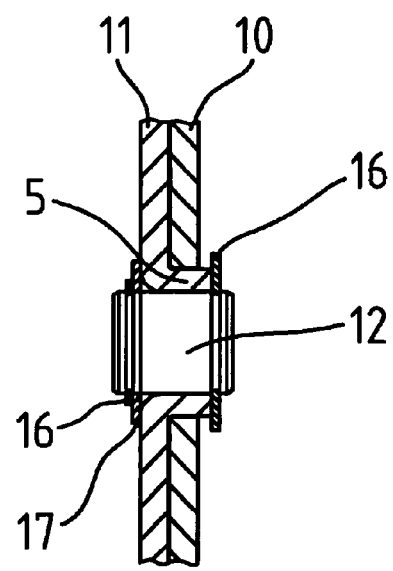
FIG. 6 shows a second exemplary embodiment in conjunction with two sideplates, in section.

A second exemplary embodiment of an articulated connection of two sideplates is illustrated in section in FIG. 6.

The element 5 extends in this case through the through-hole 4 of a neighbouring sideplate. A securing element 12 is introduced into the element 4. The securing element 12 is constructed in the shape of a bolt. Next to the end regions of the securing element 12, it respectively has a preferably circumferential annular groove into which aids 16 are introduced. The aids 16 serve the purpose of securing. The securing element 12 can also be introduced into the element 5 with the aid of a press holder. In the case of such a refinement, the securing element 12 forms a reinforcement, thereby to transmit relatively high bending moments and tensile forces between the sideplates.

Figure 7:
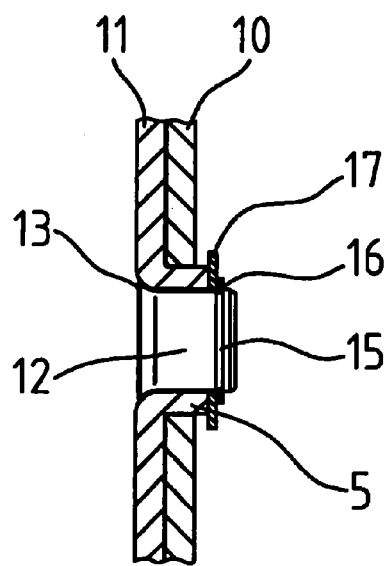
FIG. 7 shows a third exemplary embodiment, in section, of an articulated connection of two sideplates.

FIG. 7 shows a yet further advantageous refinement of an articulated joint between two sideplates. In the exemplary embodiment illustrated in FIG. 7, the securing element 12 is fashioned such that it projects from the element 5 only one side. The head of the securing element 12 is constructed such that it is adapted to the contour of the element 5.

As a result of the inventive fashioning of the sideplate, a power transmission chain is provided with a construction which can be produced cost effectively. The sideplates can, if appropriate, also be provided with a surface coating.

Figure 8:
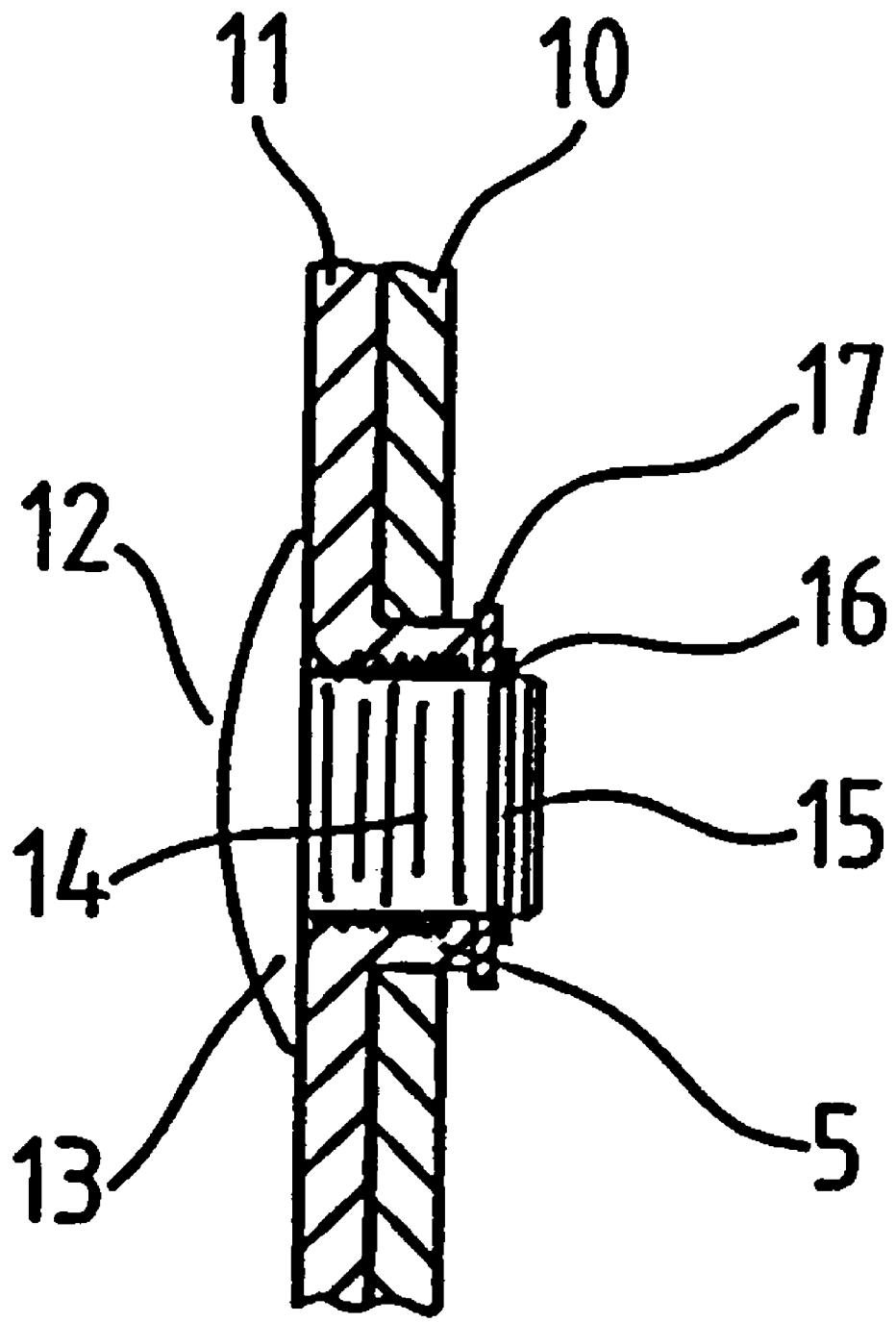
FIG. 8 illustrates an element with an internal thread and an articulated connection of two sideplates, in section.

As seen in FIG. 8, Instead of a securing element constructed in the shape of a bolt, the element 5 can be constructed with an internal thread such that it is possible to screw in a corresponding screw by means of which the sideplates of a power transmission chain can be axially secured.

The invention claimed is:

1. A metal sideplate, of a chain link of a power transmission chain, the metal sideplate comprising:
    a first end region and a second end region, the first end region defining at least two through-holes, and the second end region has a number of elements protruding from a side of the second end region, and the number of elements corresponds to the number of through-holes in the first end region, and wherein the elements are sized to at least partially extend into the respective through-hole of another sideplate during the construction of a power transmission chain; and
    a projection having a section that is substantially parallel to and spaced apart from a face of the sideplate.

2. The sideplate according to claim 1, wherein the elements are formed under a combination of tensile and compressive conditions.

3. The sideplate according to claim 1, wherein the elements are formed by collar forming.

4. The sideplate according to claim 1, wherein the sideplate is of angulated construction.

5. The sideplate according to claim 1, wherein the projection is formed integrally with the sideplate.

6. The sideplate according to claim 1, wherein a through-hole and an element of an adjacent sideplate respectively form a part of an articulated connection of two sideplates.

7. A method for producing a metal sideplate of a chain link of a power transmission chain, the method comprising the steps:
    a) providing a blank of a sideplate;
    b) constructing a plurality of through-holes in a first end region of the sideplate; and
    c) constructing a plurality of elements at a second end region of the side plate, wherein the number of elements corresponds to the number of through-holes, and the elements protrude laterally outwardly from a side plane of the sideplate; and
    d) forming at least one projection next to the elements wherein the projection projects from a the side plane of the sideplate and has a section spaced apart from and substantially parallel to the side plane of the sideplate.

8. The method according to claim 7, wherein the step of forming a projection comprises the step of:

punch drawing the projection.

9. A chain link of a power transmission chain, the chain link comprising:

a first sideplate and a second sideplate at least partially overlapping the first side plate, wherein the first sideplate comprises:

a first end region and a second end region, the first end region defining at least two through-holes, and the second end region has a number of elements protruding from a side of the second end region, and the number of elements corresponds to the number of through-holes in the first end region, and wherein the elements are sized to at least partially extend into respective through-holes of the second sideplate during the construction of a power transmission chain; and a projection having a section that is substantially parallel to and spaced apart from a face of the sideplate.

* * * * *

UNITED STATES PATENT AND TRADEMARK OFFICE
CERTIFICATE OF CORRECTION

Page 1 of 1

| | |
|---|---|
| PATENT NO. | : 7,877,978 B2 |
| APPLICATION NO. | : 11/726158 |
| DATED | : February 1, 2011 |
| INVENTOR(S) | : Christine Heppner |

It is certified that error appears in the above-identified patent and that said Letters Patent is hereby corrected as shown below:

Col. 5, line 36, after "through-hole" -- 4 -- should be inserted.

Col. 6, line 60, "and" should be deleted.

Signed and Sealed this
Twenty-second Day of March, 2011

David J. Kappos
*Director of the United States Patent and Trademark Office*